United States Patent
Meehan

(10) Patent No.: US 11,948,132 B2
(45) Date of Patent: Apr. 2, 2024

(54) CRYPTOGRAPHICALLY SECURE BOOSTER PACKS IN A BLOCKCHAIN

(71) Applicant: Fall Guy LLC, Seattle, WA (US)

(72) Inventor: Patrick Meehan, Seattle, WA (US)

(73) Assignee: FALL GUY LLC, Seattle, WA (US)

( * ) Notice: Subject to any disclaimer, the term of this patent is extended or adjusted under 35 U.S.C. 154(b) by 716 days.

(21) Appl. No.: 16/985,711

(22) Filed: Aug. 5, 2020

(65) Prior Publication Data

US 2021/0192473 A1  Jun. 24, 2021

Related U.S. Application Data

(63) Continuation of application No. 16/284,938, filed on Feb. 25, 2019, now abandoned.

(60) Provisional application No. 62/636,101, filed on Feb. 27, 2018.

(51) Int. Cl.
| | | |
|---|---|---|
| G06Q 20/06 | (2012.01) | |
| G06F 16/182 | (2019.01) | |
| G06Q 20/38 | (2012.01) | |
| H04L 9/06 | (2006.01) | |
| H04L 9/08 | (2006.01) | |
| H04L 9/00 | (2022.01) | |

(52) U.S. Cl.
CPC ....... *G06Q 20/065* (2013.01); *G06F 16/1824* (2019.01); *G06Q 20/3829* (2013.01); *G06Q 20/389* (2013.01); *H04L 9/0643* (2013.01); *H04L 9/0861* (2013.01); *H04L 9/50* (2022.05); *H04L 2209/56* (2013.01)

(58) Field of Classification Search
CPC ............. G06Q 20/065; G06Q 20/3829; G06Q 20/389; G06Q 20/02; G06Q 20/3825; G06F 16/1824; H04L 9/0643; H04L 9/0861; H04L 9/50; H04L 2209/56; H04L 9/3247; H04L 9/3239
See application file for complete search history.

(56) References Cited

U.S. PATENT DOCUMENTS

| | | | |
|---|---|---|---|
| 2012/0016761 A1* | 1/2012 | Najm | G06Q 30/06 705/26.1 |
| 2015/0352436 A1* | 12/2015 | Pieron | A63F 13/45 463/25 |
| 2017/0075941 A1* | 3/2017 | Finlow-Bates | H04L 67/104 |
| 2018/0308091 A1* | 10/2018 | Malkhi | G06F 11/1479 |
| 2019/0118094 A1* | 4/2019 | McCoy | A63F 13/85 |
| 2019/0172059 A1 | 6/2019 | Castagna et al. | |
| 2019/0220324 A1* | 7/2019 | Carver | H04L 67/10 |
| 2020/0279256 A1* | 9/2020 | Wright | H04L 9/0643 |

(Continued)

FOREIGN PATENT DOCUMENTS

| | | | | |
|---|---|---|---|---|
| WO | WO-2015196105 A1 | * | 12/2015 | ............. A63F 13/12 |
| WO | WO-2018022132 A1 | * | 2/2018 | |

OTHER PUBLICATIONS

Andreas M. Antonopoulos, Chapter 7 of Mastering Bitcoin, Jul. 2017, O'Reilly Media (Year: 2017).*

(Continued)

*Primary Examiner* — Neha Patel
*Assistant Examiner* — Chunling Ding
(74) *Attorney, Agent, or Firm* — Alleman Hall & Tuttle LLP

(57) ABSTRACT

A facility for cryptographically securing booster packs using tear transactions is described.

27 Claims, 1 Drawing Sheet

(56) References Cited

U.S. PATENT DOCUMENTS

2021/0073212 A1* 3/2021 Conley ................ H04L 9/3213

OTHER PUBLICATIONS

Pierre-Louis Aublin, RBFT: Redundant Byzantine Fault Tolerance, 2013, IEEE (Year: 2013).*
Nakamoto, S., "Bitcoin: A Peer-to-Peer Electronic Cash System," accessed from https://bitcoin.org/en/bitcoin-paper, Mar. 25, 2021; 9 pages.

* cited by examiner

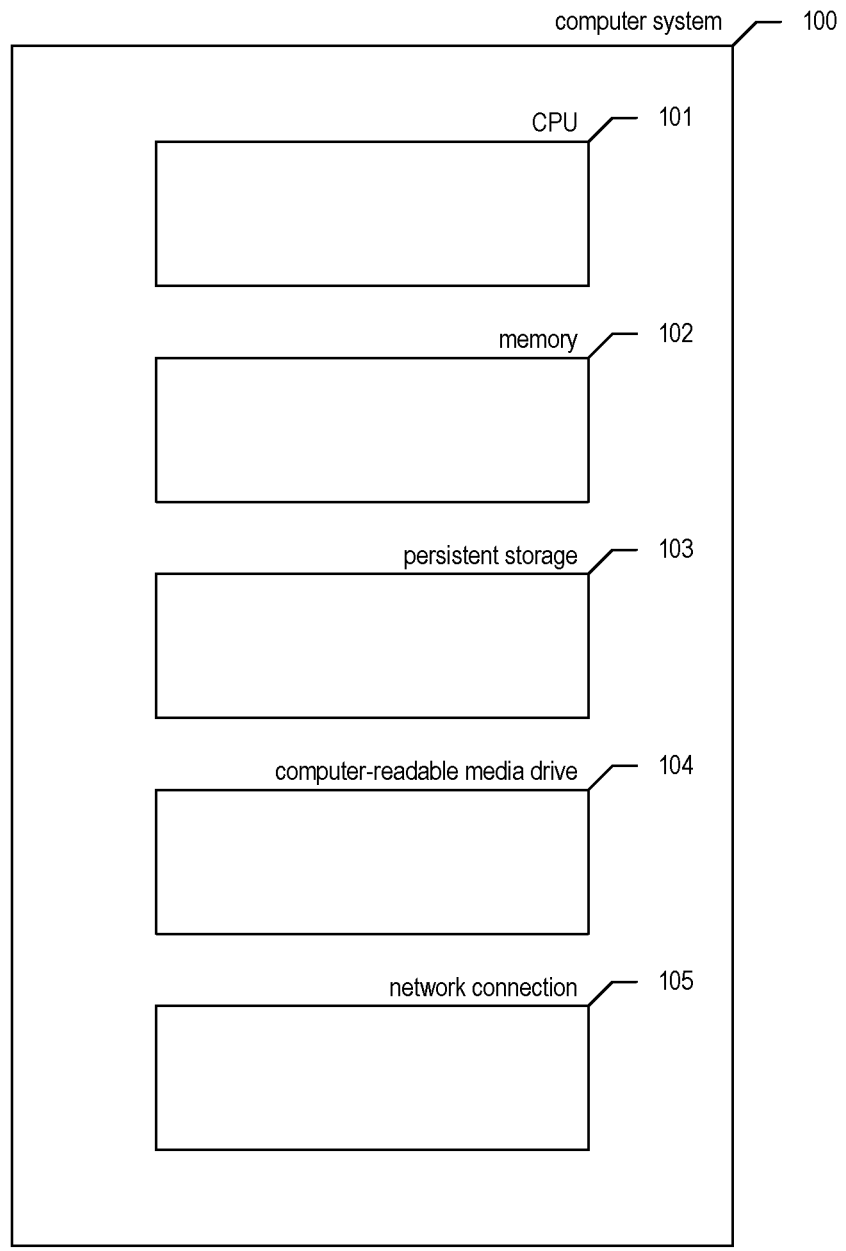

CRYPTOGRAPHICALLY SECURE BOOSTER PACKS IN A BLOCKCHAIN

CROSS-REFERENCE TO RELATED APPLICATION(S)

This application claims the benefit of U.S. Provisional Patent Application No. 62/636,101, filed on Feb. 27, 2018, entitled "Cryptographically Secure Booster Packs in a Blockchain," and is a continuation of U.S. patent application Ser. No. 16/284,938, filed on Feb. 25, 2019, entitled "Cryptographically Secure Booster Packs in a Blockchain," which are hereby incorporated by reference in their entirety.

TECHNICAL FIELD

This application is directed to the technical field of cryptographic security.

BACKGROUND

The Bitcoin system was developed to allow electronic cash to be transferred directly from one party to another without going through a financial institution, as described in the white paper entitled "Bitcoin: A Peer-to-Peer Electronic Cash System" by Satoshi Nakamoto. Such "electronic cash" systems are commonly known as cryptocurrency systems. Each participant using a cryptocurrency system is pseudo-anonymous and is known by its cryptographic identity, a sequence of characters, called public key. In addition, each participant also holds a cryptographic "private key" that pairs with its public key and is needed to transfer or spend the owned cryptocurrency. To transfer such electronic cash, a new transaction is created which is digitally signed by the owner's private key. The signing by the owner is an authorization by the owner to transfer ownership to a new owner via this transaction. A transaction is not complete until it has been placed inside a block. A cryptocurrency system, which is referred to as a blockchain system, stores the transactions in blocks of a "blockchain." The cryptocurrency system continually receives many such transactions, which are placed inside blocks. Each block holds transactions in a cryptographic structure called Merkle tree. Once the block is full, the block is "capped" with a block header which contains the hash digest of the Merkle tree containing the transactions. The hash of a block's header is stored in the block header of the next block in the blockchain to create a mathematical hierarchy of blocks. To verify the current ownerships, the blockchain can be followed from the oldest transaction to the newest transaction.

Blocks of the blockchain are publicly available to anyone to view and verify each and every transaction contained in it. Since anyone can view and verify each transaction, no participant can double-spend cryptocurrency (i.e., transfer ownership of the same currency to two or more parties). There is no central location where the blockchain is stored. Rather, the blockchain is just stored at the computers, referred to as nodes of a blockchain network, of the participants who choose to store it. In this way, blockchain systems typically implement a distributed ledger, containing all transactions, that is stored redundantly at multiple nodes (i.e., computers) of a blockchain network. Each node in the blockchain network has a complete replica of the entire blockchain. A blockchain system implements techniques to assist nodes verify that their blockchains are identical, even though the nodes may receive invalid or illegal blocks from different parties in the network. To verify that the copy of the blockchain, stored at a node, is correct, the blocks in the blockchain can be accessed from the newest to the oldest comparing the hash of the previous block to that stored in the next block. If the hashes are the same, then the block and the transactions contained in the block are verified since it is nearly impossible to find different block contents that has the same cryptographic hash. Because a hash of the previous block is stored in the next block, it is nearly impossible to change a transaction and regenerate the remaining blockchain. The Bitcoin system is an example of a blockchain system. Other blockchain systems include Ethereum, Litecoin, Ripple, IOTA, Hyperledger, and so on. At the most basic level, a blockchain system supports transactions of its currency known as "coins" or "native" tokens. The native tokens are an integral part of the distributed ledger system providing incentives to the participants to perform tasks required for proper functioning of the blockchain system. Blockchain systems may use different "blockchain protocols" for operation of their distributed ledgers resulting in different advantages and disadvantages.

Irrespective of the "blockchain protocol" used, blockchain systems also deploy additional layers of functionality on top of the base distributed ledger. The first of such layers is "smart contract," which is computer code that implements a programmable functionality such as a contract. The computer code would be executed by any node that validates transactions related to that smart contract. In addition, the smart contract itself is recorded as a transaction in the blockchain. When deployed, a part of the smart contract code called constructor executes, initializing the smart contract and its state. The state of a smart contract is stored persistently in the blockchain. Once deployed, a contract is given an address similar to a public key but without a corresponding private key. When a transaction is recorded against a smart contract, a message is sent to the smart contract (i.e., recorded in a transaction of the blockchain that identifies the smart contract), and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset other than cryptocurrencies. The inputs to a smart contract to sell a car may be the public keys of the seller and the buyer, an identity token (described below) of the car, and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard.

The next higher functionality layer, built on top of the smart contract layer, is called "application layer." This layer supports decentralized applications (dApps) and tokens representing assets other than cryptocurrency such as digital, physical, virtual, or legal assets. While these tokens cannot be used in functioning of the digital ledger itself like the native tokens, they can be used in transactions just like native tokens. Through use of tokens, distributed ledger systems can support transactions of any type, such as those relating to the sale of vehicles, sale of financial derivatives, sale of stock, payments on contracts, and so on. Tokens, which are also referred to as digital bearer bonds, uniquely identify something that can be owned or can own other things. Tokens also have an owner having their own public/private key pair. The owner's public key is set as the token owner identity, and when performing actions against tokens, ownership proof is established by providing a signature generated by the owner's private key and validated against the public key listed as the owner of the token. Tokens can be used to identify people, institutions, commodities, contracts, computer code, equities, derivatives, bonds, insurance, loans, documents, and so on. Tokens can also be used to identify collections of assets. The creation of a token for an asset in a blockchain establishes provenance of the asset, and the token can be used in transactions (e.g., buying, selling, insuring) involving the asset stored in a blockchain, creating a full audit trail of the transactions.

To record a simple transaction in a blockchain, each participant that is a party to the transaction needs an account that is identified by a public key. For example, when one person wants to transfer a car to another person, the current owner and the next owner create accounts, and the current owner also creates a token that uniquely identifies the car. The token for the car identifies the current owner. The current owner creates a transaction against the token for the car that indicates that the transaction is a transfer of ownership, indicates the public keys of the current owner and the next owner, and indicates the identity token of the car. The transaction is signed by the private key of the current owner, and the transaction is evidence that the next owner is now the current owner.

Many blockchain systems, such as the Bitcoin system, employ distributed consensus techniques to achieve a consensus as to what blocks and what transactions within those blocks are to be included in the blockchain. For example, with the Bitcoin system, a node that creates a transaction broadcasts that transaction to other nodes of the Bitcoin system. The receiving nodes store those transactions. At intervals (e.g., approximately 10 minutes), some of the nodes, referred to as mining nodes, each generates a new block of transactions that the mining node plans on proposing to be added to the blockchain. The new block includes transactions that have not yet been included in any block of the blockchain and a coinbase transaction. The coinbase transaction creates an amount of bitcoin as a mining fee and transfers that amount along with any transaction fees for transactions in the new block to a public key designated by the mining node as a mining reward. A transaction fee of a transaction is the difference between value of the inputs and the value of the outputs of that transaction. The new block also includes a hash of the block that is to be prior to the new block in the blockchain.

Bitcoin uses Proof-of-Work system where the right to create a block is determined by solving a computationally difficult puzzle. An example of such a puzzle is to find a block header whose hash has some desired characteristic, such as 12 leading zero. The header of each block includes a field, referred to as a nonce. A mining node repeatedly tries different values for the nonce until a value for the nonce is found that results in the hash having the desired characteristic. The coinbase transaction also has a nonce. So, if a hash with the desired characteristic cannot be found after all values of the nonce in the header are tried, the mining node can change the value of nonce in the coinbase transaction and then again try all values of the nonce in the header and repeat this process of changing values in the nonces until a hash with the desired characteristic is found. The process of finding a hash with the desired characteristic is referred to as "mining."

After a mining node generates a valid new block, it broadcasts the new block to other nodes as a proposed block. Other mining nodes implicitly consent to having the proposed block included in the blockchain by generating future proposed blocks that include that proposed block in the blockchain. During an interval, multiple mining nodes could generate and broadcast proposed blocks at nearly the same time. Generally, the first proposed block that a node receives will be included in its primary view of the blockchain, but it will also have an alternate view (e.g., a fork) that includes the other proposed blocks. When a mining node generates and broadcasts the next proposed block for the next interval, each mining node will add the next proposed block to its primary view of the blockchain. Upon receiving the next proposed block, a node can then determine whether its primary view or alternate view is the correct view to use going forward. Eventually, each node can assume that a proposed block in the primary view is permanently included in the blockchain based on the number of subsequent proposed blocks (e.g., six) that have been added to the primary view. The process of proposing blocks and deciding which proposed blocks to include in the blockchain is referred as achieving a distributed consensus. Because the mining nodes need to expend computational resources to find the nonce for a proposed block, this distributed consensus is referred to as a Proof-of-Work consensus. That is, each mining node needs to prove that it performed the work to find such a nonce.

Vast amounts of computational resources may be needed for Proof-of-Work mining, but the mining reward can be considerably more than the cost of mining. As a result, mining nodes may employ special purpose hardware and software so that they can be the first to generate a proposed block. Because mining consumes so much electrical power, the mining nodes are often housed near cheap sources of electricity such as hydroelectric power plants. At each interval, each mining node will expend its computational resource to find a nonce. However, except for the first mining node to find the nonce, all the computational resources are essentially wasted as is the vast amount of electrical power used by those other mining nodes. Moreover, the generating of the needed electrical power can cause environmental damage.

BRIEF DESCRIPTION OF THE DRAWINGS

FIG. 1 is a block diagram showing some of the components typically incorporated in at least some of the computer systems and other devices on which the facility operates.

DETAILED DESCRIPTION

Cryptographic "Booster Packs"

In trading card games, a booster pack is a sealed envelope of cards with a predefined rarity mix. A purchaser of a pack will know the rarity of the pack's contents, but will not know exactly what is in the pack.

A software and/or hardware facility ("the facility") provides a cryptographic model of a booster pack, suitable for use on a blockchain or in a distributed ledger system, that is transferable between users of the system. When opened, participants will not be able to easily predict what will come out of the pack, but will be able to verify that the correct assets were extracted from the pack after the fact.

The unopened booster pack is represented by a unique identifier. This is the "pack code" and may be generated offline or derived from information already in the ledger. For example, the hash of a previous block, plus a nonce, signed by the miner's private key.

Booster packs may be generated as part of a mining reward. Unopened booster packs may be traded among users on the system.

Opening the booster pack is a matter of transforming the pack code using a deterministic process that produces an unpredictable outcome.

To achieve this, we use a multi-step transaction.

To start the process of opening a booster pack, the holder of the pack creates a new transaction to advertise their intention of opening the pack. The transaction contains the pack code and is recorded by a miner on some future block. The pack is now considered "torn" and ready to be opened.

"Tearing" a pack creates an implicit transaction to open the pack governed by some rule about the future state of the ledger. For example, the rule could be that some number of blocks must be mined following the initial transaction, after which any miner can reveal the contents of the pack by signing it with her private key, thus "opening" the pack.

In this (and any multi-step transaction) the transaction fees may be shared by each miner that participates. The protocol may allow unequal transaction rewards to be offered in this case. For example, a nominal reward for processing the "tear" transaction and a major reward for processing the "open" transaction.

The "tear" transaction may optionally be expired after some number of blocks.

Optionally, an additional step may be added in which the holder of the pack signs the "open" pack with their own private key, prior to extracting the contents. If this step is omitted, then the miner who opens the pack will also extract its contents on behalf of the holder.

The contents of the "open" pack are extracted by using the transformed pack code to index into a table of pack configurations. The entire pack code may be used for this. Alternatively, the pack code may be divided into smaller indices, each of which is used as a lookup into a table. In this latter case, the indices may be used to index tables of groups of assets or of individual assets. For example, a 256-bit pack code could be divided into 32 8-bit indices, each representing a single item selected from a unique table of 256 entries. Rarity may be controlled by carefully selecting the contents of each table. The pack code may be divided in any fashion the game designer sees fit.

Packs may also contain special bonus items, such as the right to generate some number of additional packs.

Some assets from the pack may also be offered as an additional mining reward.

Example pack opening transaction flow:
1. User U0 wishes to open pack P0 and offer a reward of R0 for recording the 'tear' transaction and R1 for applying and recording the 'open' function.
2. U0 prepares a transaction request, TRN[TEAR [U0:P0:R1]:R0], and distributes it to the mining network.
3. M0, a miner, wins block BN and decides to include TRN[TEAR [U0:P0:R1]:R0] which, now recorded, becomes BN [TEAR [U0:P0:R1]]. M0 collects the initial reward, R0.
4. The protocol rules specify a maturation period of X blocks for pack opening. So the first block in which the pack could be opened is block BN+X.
5. Miner M1, continuing the chain containing BN, wins BN+X.
6. Seeing BN [TEAR [U0:P0:R1]] in the chain and no previous open, M1 decides to open P0 for U0 and collect R1.
7. M1 transforms P0 to P0' by applying an opening function P0'=open(P0) (see discussion below).
8. M1 records BN+X [OPEN [U0:P0:P0' ]] and collects R1.
9. Optional: the assets of the pack are extracted as individual items. Each item is assigned a unique identifier. This may be done by M1 and also recorded in BN+X.

Following these steps, U0's pack, P0, has been transformed to P0' through the action of both M0 and M1 over a period of X blocks. Because miners are selected by the protocol in a non-deterministic fashion, and because not all miners will use every opportunity to open every pack (due to block size or content constraints), there is a fair degree of unpredictability regarding which miner acts is M1.

The opening function P0'=open(P0) used by M1 should take into account secret information (such as M1's private key) as well as information about the state of the ledger. For example, the following items may be combined into a tuple, RP0:P0, the hash of BN+(X−1), a "set" counter denoting how many packs have been opened, a "miner" counter denoting how many packs M1 has opened, a "holder" counter denoting how many packs U0 has opened. RP0 is then hashed and signed by M1. The resulting signature is used as P0'.

Once P0' has been produced, anyone can verify that is was produced correctly by reconstructing RP0, hashing it, then checking the result with P0' and M1's public key.

When recorded, OPEN(U0, P0, P0') is an UXTO bound to U0's public key. The contents of P0' are known from the set's lookup table. U0 may hold them, or transfer them by creating new transactions.

Example set publishing transaction flow:
1. Publisher P0 wishes to distribute a new set.
2. P0 prepares a set distribution D0 and places it TRN [PUB [U0:D0]:R0]. D0 may contain all necessary data, or links to the data along with an identifying hash.
3. Miner M0 records BN[PUB[U0:D0]] and collects R0.

D0 (or the protocol) will specify a booster pack generation function and (optionally) a quantity. The generation function may be as simple as a hash chain starting with a unique identifier.

Future miners earning the right to create packs (as a mining reward, for example), may use the mining function to produce them.

Summary of Ideas:
1. A cryptographic booster back as represented by a pack code.
2. Booster packs may be offered as mining rewards.

3. The implementation of multi-part transactions, in which an initial transaction and a set of rules generates future transactions.
4. Using a multi-part transaction to create an unpredictable outcome.
5. Sharing transaction fees or rewards evenly or unevenly between miners of a multi-part transaction.
6. Using some portion of pack contents as an additional mining reward.
7. The use of a pack code as an index into an asset table.
8. The division of a pack code into components for use as indices into an asset table.
9. Controlling rarity using rarity tables.
10. Publishing asset and rarity tables for a set of cards on a blockchain.
11. Controlling overall set availability with a per-set cap on mineable booster packs.

Physical-to-Digital Collectible

A digital asset, such as a trading card, piece of art or 3d model, is tracked on a blockchain. The owner of the asset is granted the right to create a physical embodiment of the asset by using a printer or some other manufacturing process. The printed asset may include a serial number, barcode, qr code or other indicator that may be used to prove ownership of the asset.

A url with the assets location, the hash of the asset, or the text or binary asset itself may be recorded in the block. Metadata about the asset (limiting its use, transferability, number or copies available, etc.) may be published on the blockchain. Violation of asset licensing terms (i.e. art is meant to be unique, but multiple copies exist) may be flagged by users. Enforcement may also be automated using artificial intelligence techniques such as image recognition.

In a cryptographic trading card game in which users are permitted to customize art, images may be associated with individual cards by providing a url and a hash of the image at the url. To be valid, the image must be present and it must match the hash. Artists may create their own card face images and sell them under a variety of licensing terms, such as one-of-a-kind, limited edition, or applicable only to specific cards.

Example

1. User U0 wishes to print her library of cards into a paper embodiment.
2. U0 uses the utility application PRINT to read the blockchain and compute the contents of her wallet, W0.
3. W0 contains cryptographic assets A0 . . . AN. Each asset has a unique identifier as well as a schema denoting its components.
4. For each asset AX:
   a. PRINT assembles the printable components of AX (including custom art assets);
   b. PRINT generates a QR code identifying AX and its owner;
   c. PRINT composes a printable image of AX, including the QR code;
5. PRINT assembles the asset images into a printable media file F0.
6. U0 uses F0 to print the assets contained in W0, producing a physical deck, D0.
7. U1 wishes to verify that the contents of D0 match W0 and are owned by U0.
8. U1 uses the utility application SCAN. SCAN uses a camera to recognize asset QR codes and extract their contents.
9. SCAN compares the information the QR codes in D0 to the record held in the blockchain to prove that the assets belong to W0 (and thus U0).
10. If SCAN indicates that a physical asset in D0 is not part of W0, U1 may choose to decline any further dealings with U0.

Example

1. Creator C0 wishes to publish an original artwork K for association with assets.
2. C0 publishes TRN[ART [C0:URL:HASH(K):PRICE]:R0], which is recorded on the blockchain.
3. User U0, wishing to purchase the art and apply it to asset A0, creates TRN[BUY[HASH(K):A0]:R0], which is recorded on the blockchain.
4. The art K is now associated with A0 by HASH(K). There is also a record of U0's purchase of the right to use K. K may be found at URL. In addition, U0 may register an alternative URL for K, in case the original becomes unavailable.
5. Naive user U1 wishes to steal K.
6. U1 places obtains K from URL, uploads it to URL' and publishes TRN[ART [U1:URL':HASH(K):PRICE]:R0].
7. U1's TRN is rejected, as HASH(K) already exists.
8. Sneaky user U2 also wishes to steal K.
9. U2 obtains K from URL and modifies it slightly to create K' and uploads it to URL'.
10. U2 publishes TRN[ART [U2:URL':HASH(K'):PRICE]:R0], which is accepted as HASH(K) does not match HASH(K').
    a. An automated screening process utilizing machine vision may be implemented by the protocol prior to accepting the publication of K'.
11. C0 becomes aware of K' and wishes to take action:
    a. C0 may use a deterministic process acceptable (such as a computer vision algorithm) to prove that K' is substantially similar to K and publish TRN[CLAIM [C0:URL:URL']:R0].
    b. C0 may appeal to an authorized third party to manually review K' and issue CLAIM on C0's behalf.
12. U0, wishing to purchase K', first checks its authenticity:
    a. A computer vision algorithm is used to scan the database of existing images.
    b. U0 may then issue CLAIM on C0's behalf.
    c. U0 then purchases K.
13. Issuance of a valid CLAIM against U2 may result in a reward for its issuer and a penalty for U2.
14. Issuance of a valid CLAIM may cause all assets associated with K' to become invalid.
    a. U3, holding an invalid asset, wishes to preserve the asset.
    b. U3 creates TRN[BUY[HASH(K):AX]:R0], which restores the AX to a valid state.

Protocols may implement various rules, qualifications and penalties regarding the management of artwork licensing. For example, a protocol may require that artworks may only be published by authenticated accounts. A protocol may also allow designated authorities to remove or block artworks. If violations are discovered, holders of invalidated assets may be required to first repurchase the original artwork before any new artwork can be associated with their asset, thus incentivising users to check authenticity before purchasing an artwork.

Example

1. Creator C0 publishes a forbidden artwork K.
2. Only HASH(K) is recorded on the blockchain.
3. Previewing K, users U0 . . . UN are scandalized.
4. For each UX in U0 . . . UN, UX creates TRN[REPORT [UX:C0:HASH(K):"MATURE"]:R0].
5. When a threshold of REPORT's are recorded, HASH (K) is considered mature content and is treated as such.
6. U0, wishing to avoid downloading forbidden artwork, configures her utility applications to block any URL associated with a HASH(K) marked as "MATURE".
7. U0's utility applications securely purge any cached versions of K.
8. Optional: U0 reports URL to the local authorities.

Real protocols will most likely use a mix of authenticated creator accounts and permissioned transactions issued by an authority to manage violations and takedowns of inappropriate content. In this case, the blockchain is not meant as a platform for immutable, censor-resistant free-speech, but as a ledger for tracking ownership or artworks.

Cryptographic Lottery

A lottery is held with multiple participants. The outcome of the lottery may be a single winner, or all participants sorted in an unpredictable fashion from which multiple, ranked winners may be chosen. If even one contestant plays fairly, the lottery will be fair. No subset of contestants can manipulate the lottery's outcome.

It must be possible for all players to run the lottery algorithm in parallel, with no trusted third party, and arrive at the same conclusion.

The lottery is played in several steps. Players first prepare an entry, which contains a source of entropy. In a blockchain, this could be the block they wish to propose along with nonce or a random number. The entry is hashed and the hash is signed with the player's private key.

The signed hash is then published to all players in the lottery (but the entry is not).

All hashes are then gathered by each player, sorted and hashed. The resulting hash should be identical for all players that see the same list.

Before the players reveal their entries, the hash of the list must be signed using a multi-signature algorithm. The result will prove that all players saw the same list.

Finally, all players reveal their entries. The entries themselves are gathered by each player. Using the list of hashes from the previous step, each player can use verify themselves that the correct entries were published.

The list of entries is then sorted and hashed. The resulting hash is then used as a source of entropy for picking a winner or ranking the players. For example, the hash may be XOR'd with each player's public key, and then the keys sorted.

Once a winner has been identified, all players will be asked to sign the outcome with a multi-signature. If any (or some number of players) refuse to sign the winning entry, any player may prove the outcome by recording the state of the lottery (the entries and the multi-signed hash). Ideally, the majority of players will acknowledge the outcome and this will not be necessary.

Proof of Participation

A cryptographic lottery is used to choose the miner of the next block. Biases may be introduced based on various design criteria. For example, the age of the mining account or the balance of some resource it holds.

For proof of participation to work, there must be some form of throttling or qualification (including authentication) on mining accounts to deter a sybil attack.

Forks may be created if some group of miners conspire to run their own lottery or if a single user defeats the mining account creation constraints. In this case, the outcome of multiple lotteries with different sets of participants may be proposed, thus creating forks in the blockchain.

Should forks arise, a branch may be chosen based on some branch selection rule or heuristic.

A simple rule is to count number of participants and choose the branch generated by the most participants.

A weighted vector of various criteria may be used to model more complex selection rules.

Branch selection rules may also take into account information about individual participants. For example, if a subset of participants are particularly trusted, any branch containing those participants may be favored.

Whenever a fork occurs, there exists the possibility of pending transactions being recorded in multiple branches, thus creating double-spends. The owners of these transactions may wish to prevent or guard against this.

Transaction owners may set criteria for the pool of future lottery participants to meet and require their pending transactions to become invalid if those criteria are not met.

For example, a transaction submitted after a specific block might specify that the number of lottery participants will not shrink by less than some percentage, or that certain lottery participants must be present. If a block is created as a result of a lottery that does not meet the criteria, then the transaction will be not be eligible for inclusion in that block (or any block thereafter).

If multiple branches are known, users may explicitly choose which branch to transact on based on their own assessment of available branches and the participant pools that created them.

Transactions are created using a hash of a block in the desired branch and with invalidation criteria based on the participant pool.

Example 1. 100 out of 100 miners participate in a lottery and produce a block BN.
2. 100 participants is the majority of participants, so BN is widely recognized as the next block.
3. User U0 wishes to create a transaction (such as a payment to U1) that will only be valid if most miners continue to participate.
4. U0 prepares a transaction TRN[REMIT [pkey=U1:amount=500]:branch=BN:confidence=0.95 reward=R0].
5. 90 out of 100 miners participate in a lottery and produce block BN+1.
6. 90 is still a majority, so BN+1 is widely recognized as the next block.
7. As U0's transaction specified a confidence level of 95% and only 90% of known miners are participating, the transaction is invalidated and will be ignored.

Proof of Diversity—Round Robin

An alternative method to choosing a branch is to look for the branch with the longest stretch of non-repeating participants, i.e. the "most diverse" branch.

If a list of participants is known ahead of time (or if participants are required to register on the blockchain ahead of a round), the protocol can simply sort that list and work through it in a linear fashion, thus distributing the work "round robin."

One problem with this approach is that every participant may not always be available. Some may be temporarily offline, and some may quit altogether.

To address this, instead of specifying a hard constraint on the order of participants, we can think of each block as mineable by a "most favored" miner. We can consider all other participants by their "distance" to the expected participant. The distance may be understood as a penalty score. This gives us a clear order of fallback preference if a miner is unavailable.

The penalty score may be calculated in a number of ways. The simplest is lexical distance between participant's keys, with the preferred miner's key as the "origin" and lexical order as a tie-breaker. This provides an unambiguous ranking by which fallback participants will be accepted.

To avoid an ongoing "neighbor" advantage when a participant goes offline, fallback participants may be "shuffled" each round by using information from a previous round. For example, each participant's public key may simply be XOR'd with a previous block's hash. In this way, even though the idea of a distance from the expected participant will hold, the order of fallback participants will be different each time.

Additional constraints may be placed on participants in a round. For example, participants may be required to present themselves as fallbacks if present, or be excluded from their turn.

Participants acting as fallbacks may also be prohibited from taking their turn when the time comes.

Participants who are repeatedly unavailable over a number of rounds should eventually be pruned.

Branch selection is based on distance and time. Once a full cycle has been completed, if the majority of players are honest, the correct branch should have the highest diversity and the lowest penalty.

Example

1. Participants M0 . . . MN are known at the start of the round.
2. BN will be the first block mined.
3. M0 . . . MN are lexically sorted by public key; M0 is the first expected participant.
4. All participants prepare and distribute candidate blocks for BN.
5. No block is distributed by M0, who is offline.
6. Competing blocks are scored by XOR'ing their author's private keys with the hash of block BN−1.
7. MX is chosen instead as the best candidate for BN, producing a small error penalty for that block.
8. A penalty equal to the number of participants to date is assigned to MX.

Proof of Diversity—Random Walk

Building on ideas from the "round robin" variant, a "random walk" may be used to shuffle participants. A random walk should be deterministic but unpredictable.

As with round robin, the branch selection heuristic is diversity and accuracy. Over time, the most diverse branch with the closest matching participants should win.

Two examples of "random walk" functions:
1. A hash chain or nonce (such as the block number) is signed with the private key of each block's winner to produce a "shuffle." The next block is won by the participant whose public key has the lowest lexical value when XOR'd with the shuffle.
2. Each participant signs the block number with their private key and includes the result in their candidate block. The result with the lowest lexical value wins.

To encourage diversity, a penalty may be added each time a participant wins a block. This penalty will be considered when scoring, and may diminish over time or eventually reset.

The penalty may be equal to the overall number of participants. This will allow all active participants to create a block before beginning the next round.

Example

1. M0 has just won block BN.
    a. When preparing BN, M0 created SIGN(M0, N) by signing the block number N with her private key and including the result as part of BN.
2. A penalty equal to the number of participants to date is assigned to M0.
3. Participants M0 . . . MN prepare candidate blocks for BN+1.
    a. For each participant MX, the candidate block contains SIGN(MX, N+1).
4. As the candidate blocks are circulated, each recipient evaluates the newest block against the current leader.
    a. SIGN(M0, N) is XOR'd with the public key of the leading block's author.
    b. SIGN(M0, N) is XOR'd with the public key of the challenging block's author.
    c. The result with the lowest lexical value wins.

Example

1. Mining participants M0 . . . MN prepare candidate blocks for BN.
2. For each participant MX, the candidate block contains S=HASH(SIGN(MX, N)).
3. As the candidate blocks are circulated, the block with the lowest lexical value for S wins.

To avoid a sybil attack in which participant accounts are rapidly created until a winner is found, the protocol may require new accounts to register some number of blocks in advance of being considered for a round. Additional constraints on participant accounts (such as stake or burn) may also be introduced.

Block Points Budget

Instead of or in addition to a block size limitation, a protocol may assign point values to transaction types or a transaction scoring system along with a points budget for each block. Thus, certain types of transaction may take up more of the budget. We would expect the fees for transactions with higher point costs to rise. This enables protocol designers to influence the cost of transactions without specifying a hard cost.

Example

1. LIST transactions have a point value of 1 and can be used to list an item for sale.
2. BUY transactions have a point value of 1 and can be used to buy an item.
3. COLOR transactions have a point value of 2 and can be used to change an items color.

4. UPGRADE transactions have a point value of 5 and can be used to merge two items to make a more powerful item.
5. REGISTER transactions have a point value of 10 and register a new user account.
6. Each block has a budget of 20 points.
7. Users of the system offer transactions rewards to miners, i.e. TRN[LIST [ . . . ]: reward=R0].
8. It would be expected, given the point values and budget, that, even in a free market of transaction fees:
    a. the market price for LIST and BUY will stay roughly the same;
    b. the market price for COLOR will be roughly twice LIST or BUY;
    c. the market price for UPGRADE will be roughly five times;
    d. the market price for REGISTER will be roughly ten times.

In the example above, the protocol specifies specific transaction types and uses a point value to limit how many of each transaction may be included in a block. Nothing is said about transaction fees or how they are paid. For example, they could be offered and paid in an on-chain currency, or through some other currency. Regardless of the payment method, the design of the protocol should influence the free market value of each transaction type.

Work-Validated Transactions; Transaction DoS Prevention

The protocol may require transactions to show that some amount of work has been performed to be considered for inclusion in a block. This may be specified as a constant, adjusted with an algorithm, or decided arbitrarily by miners on an ad hoc basis.

A correlation between transaction work and mining reward may be created to encourage miners to prefer transactions with more work, even when transaction fees are equal (or lower).

Transaction work may also be averaged and used as a scalar on the miner's fees. In other words, a miner might be entitled to less of the fees offered if the transactions they select contain insufficient work.

Example

1. A "proof of work" function $0=p(k,n,d)$ is used, where work is shown based on a key k, a nonce n and a difficulty d.
2. The protocol has determined an overall combined work difficulty of 100 per block.
3. On average, blocks contain 10 transactions each.
4. User U0 wishes to submit a transaction and creates [TRN[<body>]:k=HASH(<body>):n=S:d=10].
    a. The value of key is the hash of the transaction body.
    b. The value of nonce is the solutions S, found by solving $0=p(k,n,d)$.
    c. The difficulty value is 1/10th of the block difficulty.
5. Miner M0 wins block BN and includes U0's transaction along with several others.
6. The difficulty values of transactions in BN only add up to 93; there weren't enough suitable transactions.
7. Miner M0 receives 93% of the mining reward and transaction fees; the balance is burned (or otherwise redistributed).

Limiting Mining Account Creation

A protocol may require mining accounts to register or be created according to some rule before they can become eligible to mine a block or compete to mine a block. For example, a protocol may require new mining accounts to hold more currency than any existing mining account.

It is also possible to distribute mining accounts as part of the mining process. As part of the mining reward, miners may receive a mining power-up. This may be rewarded to the block's winner, or to miners at random or based on any criteria (such as participation, or having a certain account balance).

The account power-up may be used by the miner who received it to "level-up" their mining account. A higher level account may be given certain advantages, such as eligibility for higher rewards. Alternatively, the power-up may be used to create a new mining account.

Additional constraints may be placed on the power-up. It may be specified to be non-transferable, if used to level-up an account. If used to create a new account, it may be required to be sold at auction to the highest bidder. If required to be sold at action, some portion of the auction proceeds (a percentage or any amount over a threshold) may be burned. The burned currency may become re-mineable or may be redistributed in some other fashion.

Round-Relative Reward Brackets

To encourage certain behavior, mining rewards (and possible transaction fees) may be scaled in a non-linear fashion. To do this, any attribute (or set of attributes) from the participants may be used to derive a reward score. The participants may then be sorted and the sort order used to determine how much of a mining reward (and/or fees) each participant is eligible to receive should they win the block lottery.

For example, if a protocol designer wished to encourage participants to hold a large balance of currency ("stake") without using that stake to influence the likelihood of winning and without paying a reward proportionate to the stake, participants could be sorted by stake with the highest stakeholder being eligible to receive 100% of the fees and rewards and the lowest stakeholder being eligible to receive only 80% of the fees and rewards. Participants ranked between may be mapped linearly into the reward scale, or may be lumped into buckets.

Other attributes than stake, or a combination of attributes, may be used for ranking. A protocol designer might wish to consider the number of blocks a miner has participated in. Or the number of times a miner has leveled up their account instead of selling the right to create a new account.

Example

1. A protocol scales a mining rewards based on stake.
    a. The reward is not a percentage of stake; rather it is a fixed payout of mineable currency plus transaction fees offered by users.
2. Participants are sorted into brackets. Brackets take the highest and lowest stake in the round as bounds.
3. 100% is offered to the top 5%, 50% is offered to the bracket of the lowest 20%, and 80% is offered to everyone in between.
4. All participants in a round are known and have an equal chance of winning the next block, regardless of stake.
5. In round N, with 100 participants the lowest stake is 100, the next lowest is 2000 and the highest is 5000.
    a. Miner M0, with a stake of 100, is alone in the lowest bracket.
    b. Miner MX, with a stake of 2000 is in the middle bracket.
6. MX wins block BN. MX's reward is scaled by 80%.
7. M0 wins block BN+1. M0's reward is scaled by 50%.

8. M0 raises her stake to 2000.
   a. 2000 is now the lowest stake.
   b. M0 and MX are both now in the lowest bracket.
9. MX, with a stake of 2000, wins block N+2. MX's reward is scaled by 50%.

In the above example, the maximum award for the blocks mined is fixed. Had any participant with a top bracket stake won, that participant would have been entitled to the maximum reward. In step 8, miner M0 raises her stake, thus "dragging" MX (and possible a number of other miners) down into the lowest bracket. At the same time, the holder of the top stake of 5000 would gain no additional reward by doubling her stake to 1000.

Stake was chosen for the example, but any other rule, attribute, configurable resource or combination thereof may be used.

This mechanic may be thought of as modeling the Red Queen from Alice in Wonderland, who has to run faster and faster to stay in the same place. In the case of stake, the rich don't necessarily get richer; they would need to continuously reinvest just to stay competitive.

Branch Confidence Score; Node-Adjusted Economy

In a Proof-of-Participation blockchain where the number of participants is known from block to block, a confidence score may be derived from the number of participants. The score may simply be the number of participants, or may take more factors into account (such as the balance of funds held by the participants).

The confidence score may also take previous blocks into account and may be weighted to filter out small changes in the participant pool.

If a large number of participants suddenly vanish, the confidence score should drop. If an alternate branch becomes known in which a number of participants are shared, in addition to being exposed as cheaters, those participants will vanish from the confidence measure of each branch.

The confidence score may be provided as a simple measure of a branch's health. More radically, in a currency-only protocol, the confidence score may be used to scale the currency supply. This may be applied to mineable currency. It may also be directly applied to account balances. In the latter scenario, if half of the confidence vanishes (presumably into another branch), then half of the currency will vanish with it.

Standalone Work

Units of work may be used to secure a blockchain for the purpose of immutability without also being the means by which the miner of the next block is decided.

In a Proof-of-Participation or Proof-of-Stake blockchains, work may be performed independently of block creation. Once a block is created, the miner of that block will need to complete work of some difficulty to receive their transaction fees and mining reward. The difficulty of the work may be adjustable based on any criteria. The protocol will not wait for this work to complete and will continue on to the next block. The miner may publish the associated work and collect their fee at any time.

Example

1. Miners M0 . . . MN participate in a round of the protocol.
   a. A round may be a cryptographic lottery, round-robin or an inexpensive competition.
2. Prior to preparing any new block, any unincorporated units of work are identified.
   a. Unincorporated units of work are work solutions to previous blocks.
   b. Their hashes should be incorporated into the latest block.
3. M0 wins the round and prepares block BN, using the hash of BN−1 and the hashes of any unincorporated units of work.
   a. The remaining miners continue on to the next round (BN+1) without waiting.
4. M0 solves a proof-of-work for BN with difficulty D to obtain BN', taking as long as necessary.
   a. The difficulty for block BN is determined (by protocol rules) to be D.
5. M0 submits BN' and receives her reward.
6. BN' is shown to be an unincorporated unit of work.
7. BN' is eventually included in a future block, such as BN+X.

Multipart Transactions

A protocol may specify transaction types that require multiple steps to complete.

Example

1. A protocol specifies FOO, which must be followed by BAZ in X blocks and BAR in Y blocks.
   a. Each transaction may include information from the current or previous blocks or miners.
   b. X or Y may be the result of calculations, depending on the transaction specification.
   c. A different transaction fee may be specified for each step.
2. User U0 creates FOO.
3. Miner M0 adds FOO to block BN.
4. After X blocks, miner M_ adds BAZ to block BN+X.
5. After Y blocks, miner M_ adds BAR to block BN+Y.

Multipart transactions give protocol designers a way to model outcomes based on the future state of the ledger. They are used, for example, in the implementation of a cryptographic booster pack.

Key Policies

Blockchain key holders may publish on a blockchain a security policy governing the use of their keys on that (or any other) blockchain. The key policy may be used to limit the types of transaction the key can create (and can be created for the key). For example, a key could be limited to a maximum balance of funds that it may hold. Transactions that overfund the key will be rejected (or capped).

Keys policies may also authorize delegate keys. If a key is funded (or can perform some set of transactions), a delegate key may be created and signed by the issuing key. The delegate key may then act on behalf of the originating key. Delegate keys will usually be granted a subset of rights. Creation of delegate keys is itself a right.

Key policies may also be created to overflow funds to other keys at a certain point. If a key with an overflow policy is overfunded, the excess funds will be diverted to another key.

An additional benefit of publishing a key policy is the strong identification of valid keys on the blockchain; it will not be possible to permanently lose currency by sending it to a malformed public key.

Named Keys

Key policies may be used to bind unique, human-readable names to keys. A protocol may additionally specify naming rules and costs, such as work or burn. Top-level key name domains may also be created.

Example

1. A protocol specifies a naming rule: <top>.<middle>.<sub>.
2. To specify a top level name, a transaction must be submitted with a proof-of-burn.
3. The protocol requires a top-level naming proof-of-burn difficulty to be 1 greater than the average of any previous top-level naming proof-of-burn.
4. User U0 wishes to create a top level name and submits TRN[TOPNAME [U0:"foo": burn=10000]:R0].
5. Miner M0 wins the next block, adds the transaction and collects R0.
6. U0 wishes to bind their public key to a name and submits TRN[BIND [U0:"foo.bar.baz"]:R1].

Example

1. A protocol allows arbitrary key names of up to 32 characters.
2. Creating a key name consumes a name ticket, which is a mineable one-use item randomly won.
3. User U0 wins a name ticket T0 from miner M0 in an auction managed by protocol rules. a. I.e. TRN[BID [U0:T0:bid=1000]:R1].
4. User submits TRN[NAME [U0:T0:"vanityname76"]: R1].
5. As "vanityname76" was not yet taken, the name becomes an alias for U0 usable in all future transactions.

Currency Vault

A key might be constrained by a key policy to only create time-released coin transactions equal to or less than some limit, i.e. no more than 1000 units of currency to be released after a three day waiting period.

Master keys can be generated offline and held in cold storage (a bank vault, for example). Rights-limited delegate key can then be created for day-to-day use. If any of these are stolen or compromised, a master key can be recovered and used to revoke the stolen key and cancel any transactions it may have created.

Example

1. User account U0 is created offline.
2. User account U0' is created offline.
3. Transaction POLICY [U0:<U0' access>] is created offline and signed by U0.
   a. The access policy gives U0' access to funds held in U0.
   b. U0' is only given permission to transfer funds from U0 to U0'.
4. The U0 to U0' access policy transaction is brought online and published to the blockchain.
5. Transaction POLICY [U0': <U0 access; 3-day waiting; 5000 limit>; U0 overflow] is created.
   a. The access policy gives U0 access to funds held in U0'.
   b. The waiting policy specifies a cooling off period of 3 days before any funds can be transferred out of U0'.
   c. The limit policy caps the account balance at 5000.
   d. The overflow policy means any funds in excess of the limit will be automatically deposited into U0.
6. U0 is moved to cold storage and held in a safety deposit box.
7. U0' is used daily to safely move funds out of U0.

In the example above, U0' is given permission to move funds out of U0. Giving permission to U0 to move funds out of U0' allows funds to be recovered immediately, as U0 is not constrained by the 3-day cooling off period.

If an U0' becomes compromised, all an attacked can do is move funds out of U0 and wait for them to cool off. If policies are in place to detect this, or if unexpected transactions occur, U0 may be used to immediately transfer funds back out of U0' and to revoke its permissions.

Keep-Alive Policies

A key policy may be created that requires periodic 'keep-alive' transactions to be recorded within some number of blocks or within some time period. If a keep-alive transaction is not recorded, the contents of the key's account will then be transferred to a fallback key. This may happen all at once, or over a period of time.

A blockchain protocol may require that all keys have published keep-alive policies. Fallback loops will not be permitted; root keys must not have fallbacks. Keys without fallbacks will lose currency. Lost currency may be burned or may become re-mineable depending on the protocol specification.

Keep-alive policies may be fulfilled by delegate keys. A master key in cold storage may have its keep-alive fulfilled by a delegate key.

Requiring keep-alive policies for all keys may be used by a protocol designer to assure that no funds are permanently lost from the economy.

Keep-alive policies may apply to any asset managed by the blockchain, not just currency.

Example

1. User accounts U0 and U1 are created.
2. Transaction POLICY [U0:<annual keep-alive>] is created and signed by U0.
3. Transaction POLICY [U1:<monthly keep-alive; U0 heir>] is created and signed by U1.
4. Once a month, in no other outgoing transactions have been signed by U1, U1 may creates a PING [ ] transaction.
5. The private key of U1 is eventually lost.
6. After one month, the balance of U1 is transferred to U0.
7. Unfortunately, the private key of U0 has also been lost.
8. After one year, the balance of U0 is liquidated.
   a. A protocol may optionally specify that liquidated funds become re-mineable.

Ledger License

It may not be possible to secure a blockchain protocol by licensing its mining software alone. Due to their decentralized nature, the critical artifact in a protocol is the ledger itself. If a competing version of the ledger is created by any means, it may be indistinguishable from (or even supplant) the genuine article.

The ledger itself may be protected through licensing by embedding proprietary content in the genesis block (such as proprietary text or a corporate trademark) and characterizing any subsequent version of the ledger as a derivative work. The ledger itself may then be licensed. Holders of the ledger will be in violation of its licensing terms if they use unauthorized mining software (for example). Individuals publishing copies or derivations of the ledger may be violating both copyright and trademark laws.

The ledger license may also include a terms of use for the ledger.

The idea here is simply: include licensing terms (and possibly visual identity, such as a logo) in the genesis block of the ledge.

Mixed Trust Protocol

Some blockchain protocols require a great deal of resources to operate in a fully trustless environment. Others could be greatly accelerated with the inclusion of trusted parties. In some cases, the presence of trusted parties may also be used to resolve ambiguity by end users of the protocol. For example, an end user who becomes aware of multiple forks, may wish to create transactions only for a fork that contains blocks mined in participation with trusted parties.

To this end, miners may be incentivised to obtain certification that verifies some quality about them. For example, a notarized certificate that confirms their citizenship or their agreement to a certain contract. The certificate need not identify the miner directly, but may instead name some trusted third party, such as a notary, or a trusted agent or representative, such as a law firm.

The protocol author may specify levels of trust and even name providers. Alternatively, the trust framework may be provided and it may be left up to users of the protocol to identify trust providers.

If canonized in the protocol, trust levels may be used to influence outcomes and rewards. If specific only by users, trust levels may act as a scalar on transaction fees. For example, a user could offer one fee to untrusted miners and another fee to miners she trusts (based on any criteria). In another scenario, the entire fee could always be charged, but a portion of it would evaporate if transacted by an untrusted miner. This could be built in to the protocol in such a way that a trust criteria must always be present to get a full reward.

In this approach, trusted parties are not mandatory to make a protocol work, but may be used by protocol participants (at their discretion) to make decisions.

Blockchain Protocol for Real Goods

Holders of inventory or producers may offer their merchandise for sale on a blockchain along with a storage contract and a set of collection criteria. The merchandise may be for immediate sale, for sale under an option or for sale as a future (i.e. the product will be manufactured some time after being purchased), and may be offered in whatever units the seller specifies. The storage contract allows the buyer to leave the merchandise in the seller's warehouse or to transfer the merchandise to an affiliated warehouse.

To receive the merchandise, the buyer must meet the collection criteria specified by the seller. If the buyer is unable to meet the criteria at the time of delivery, then the merchandise must be resold. In the case of alcoholic beverages, the collection criteria will depend on local regulation. For example, the collection criteria for a barrel of whiskey sold by a craft distiller in Washington State might be physically at the distillery, in bottles, delivered over a number of days, limited to the number of bottles the distillery may legally sell to an individual in any single day.

The collection criteria may also change over time.

The merchandise offering will be recorded on the blockchain along with the quantity of units available. The merchandise may then be sold and its ownership tracked and traded on the blockchain.

Regulatory constraints may be modeled on the blockchain as compliance primitives. For example, "know your customer" (KYC) and "anti money laundering" (AML) may be required. If KYC is implemented for an offering, the issuer of that offering may place restrictions on its resell based on customer information, such as nationality.

Additional constraints, such as non-transferability, may also be implemented. In the case of a future, producers may wish to sell a non-transferrable futures option and hold funds in escrow. Once the product has been manufactured and is ready for consumption, the ban on transferability may be lifted and the funds released. Holders of product will not be able to transfer ahead of the release without giving up their private key. No buyer would accept this, as whoever held the original private key could steal the product back as soon as the ban is lifted.

Tokens Backed by Manufactured Goods

Speculators on a blockchain may want a reserve token that has a relatively stable short-term price. Tokens pegged to currency and specific commodities (such as gold) have been proposed. These tokens require the storage of the backing asset in a secure location. They are meant to track the value of the backing asset as closely as possible.

The suggestion here is that a manufacturer may offer a token backed by product. For example, a distiller may offer a token backed by bottles of vodka. This is different from a token backed by a real asset (such as gold) in that the backer is continuously producing the backing asset, and the backing asset is continuously being sold and consumed.

The manufacturer will sell the tokens at some market price, most likely based on the wholesale or retail price of its products. The manufacturer will then promise to repurchase the tokens for some price. The price may be a simple fixed price or may be based on some metric, such as a discount on the product's wholesale price.

Depending on the offering, the backing product may exist and be stored by the manufacturer, or may not exists but be easily manufactured. Manufacturers may offer tokens using a "fractional reserve" in which more tokens are sold than exist in the manufacturer's inventory. Manufacturers may offer tokens under a supply policy, such as under a supply limitation that a multiple of the required backing product to be held in storage but a fraction of the manufacturer's output and sales.

Buyers seeking a stable backing will choose tokens from manufacturers who have robust sales history over a long period of time, limit their token offerings to a fraction of their output and fully back their tokens with inventory.

Implementation Details

The computing systems (e.g., nodes) on which the above-described techniques may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the systems. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

The systems may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the systems may be implemented in hardware using, for example, an application-specific integrated circuit (ASIC) or field programmable gate array ("FPGA").

I claim:

1. A method performed by one or more computing systems for securing booster packs, the method comprising:
   generating a tear transaction request that includes a user identifier and a booster pack identifier and specifies a first payment for recording the tear transaction and second payment for recording an open transaction;
   distributing the tear transaction for recording in a blockchain;
   in response to recording the tear transaction by a first miner computing device in a first block of the blockchain, paying the first payment to the first miner computing device;
   in response to recording by a second computing device a second block of the blockchain that is more than a specified number of blocks after the first block,
   applying an open function to a booster pack associated with the booster pack identifier to transform the booster pack identifier to a transformed booster pack identifier;
   generating a first open transaction that includes the user identifier, the booster pack identifier, and the transformed booster pack identifier;
   causing the second miner computing device to record the first open transaction in the second block of the blockchain;
   paying the second payment to the second miner computing device;
   wherein choosing the first miner computing device comprises:
   encrypting a first hash value for a first participant computing device to obtain a first encrypted hash value at least in part by signing the first hash value with a private key associated with the first participant computing device, the first hash value corresponding to a first entry containing a first source of entropy;
   sending, to each of a plurality of participant computing devices, the first encrypted hash value;
   receiving, from each of the plurality of participant computing devices, a respective encrypted hash value signed with a private key associated with the participant computing device, each respective encrypted hash value corresponding to an entry containing a respective source of entropy;
   sorting the respective encrypted hash values and the first encrypted hash value to generate a sorted list of encrypted hash values;
   generating a second hash value from the sorted list of encrypted hash values;
   sending, to each of the plurality of participant computing devices, the second hash value generated from the sorted list of encrypted hash values;
   receiving, from each of the plurality of participant computing devices, a respective hash value generated from a respective sorted list of encrypted hash values;
   comparing the second hash value generated from the sorted list of encrypted hash values to each of the respective hash values generated from the respective sorted list of encrypted hash values at least in part to determine whether each of the plurality of participant computing devices and the first participant computing device generated the same sorted list of encrypted hash values;
   in response to receiving, from each of the plurality of participant computing devices, the respective hash value generated from the respective sorted list of encrypted hash values:
   receiving, from each of the plurality of participant computing devices, an entry corresponding to the respective encrypted hash value received from that participant computing device,
   verifying that correct respective encrypted hash values, each corresponding to an entry, were received,
   generating a list of entries from the received entries and the first entry,
   sorting the list of entries,
   generating a hash value from the sorted list of entries, and
   ranking the plurality of participant computing devices and the first participant computing device based on the hash value generated from the sorted list of entries.

2. The method of claim 1, wherein choosing the first miner computing device comprises:
generating a public and private key pair for each of a plurality of participant computing devices;
for each of the plurality of participant computing devices, deriving a deterministic and unique penalty score based the participant's private key of the participant computing device;
choosing the participant computing device with the lowest penalty score as the first miner computing device.

3. The method of claim 2, further comprising:
receiving, from each of the plurality of participant computing devices, a shuffle, the shuffle corresponding to a hash chain or nonce signed using a private key associated with the participant computing device;
for each of the plurality of participant computing devices, verifying the shuffle received from the participant device using a public key associated with the participant computing device; and
sorting the received shuffles.

4. The method of claim 2, further comprising:
for each of the plurality of participant computing devices, calculating a penalty score for the participant computing device based on a public key associated with the participant computing device and a first shuffle;
sorting the calculated penalty scores,
wherein choosing the participant computing device with the lowest penalty score as the first miner computing device is based at least in part on the sorted calculated penalty scores; and
receiving, from the first miner computing device, a second shuffle based at least in part on the first shuffle signed using a private key associated with the first miner computing device.

5. The method of claim 2, further comprising:
shuffling participant computing devices creating blocks in the blockchain at least in part by,
for each of a plurality of rounds,
for each of the plurality of participant computing devices,
generating a penalty score for the participant computing device, and
selecting, from among the plurality of participant computing devices, a participant computing device with the lowest generated penalty score for creating a block in the blockchain for the round; and
writing, to the blockchain, a block received from the selected participant computing device.

6. The method of claim 5, further comprising:
identifying a first branch and a second branch of the blockchain;
truncating the first branch and the second branch of the blockchain so that they are of equal length;
for each block of the first branch of the blockchain, calculating a penalty score for a contributor of the block of the first branch of the blockchain;
for each block of the second branch of the blockchain, calculating a penalty score for a contributor of the block of the second branch of the blockchain, and comparing the calculated penalty score for the contributor of the block of the second branch of the blockchain to a penalty score for a contributor of a corresponding block of the first branch of the blockchain;
calculating a score for each branch based on the comparisons; and
selecting a branch based on the calculated scores.

7. The method of claim 5, further comprising:
providing, to each of the plurality of participant computing devices, a maturation period;
recording a tear transaction on a selected block of the blockchain;
identifying a block in the blockchain based on the selected block and the maturation period; and
selecting a seed value based on the identified block.

8. The method of claim 7, further comprising:
recording a unique identifier in the blockchain; and
combining the selected seed value with the recorded unique identifier to derive a new seed value.

9. The method of claim 8, further comprising:
providing, to each of the plurality of participant computing devices, an awards schedule; and
determining contents of a booster pack based on the awards schedule and the derived new seed value.

10. The method of claim 1, wherein at least one source of entropy includes:
an identified block of the blockchain and a nonce; or
an identified block of the blockchain and a random number.

11. The method of claim 1, wherein ranking the plurality of participant computing devices and the first participant computing device based on the hash value generated from the sorted list of entries comprises:
for each of the plurality of participant computing devices and the first participant computing device, XORing the hash value generated from the sorted list of entries and a public key associated with the participant computing device to generate a key value; and
sorting the generated key values.

12. The method of claim 11, further comprising:
selecting the first miner computing device based on the sorted key values.

13. The method of claim 1, wherein verifying that correct encrypted hash values, each corresponding to an entry, were received comprises:
for each of the plurality of participant computing devices,
decrypting the encrypted hash value received from that participant computing device using a public key associated with that participant computing device,
hashing the entry corresponding to the encrypted hash value received from that participant computing device, and
comparing the hashed entry corresponding to the encrypted hash value received from that participant computing device to the decrypted hash value received from that participant computing device.

14. A computer-readable storage medium storing instructions that, upon execution by a computing system having at least one memory and at least one processor, cause the at least one processor to perform a method for choosing a miner computing device of a block in a blockchain, the method comprising:
generating a public and private key pair for each of a plurality of participant computing devices of the blockchain;
for each of the plurality of participant computing devices, deriving a deterministic and unique penalty score based on the participant's private key of the participant computing device;
choosing the participant computing device with the lowest penalty score as the miner computing device for mining a block within the blockchain;

encrypting a first hash value for a first participant computing device to obtain a first encrypted hash value at least in part by signing the first hash value with a private key associated with the first participant computing device, the first hash value corresponding to a first entry containing a first source of entropy;
sending, to each of a plurality of participant computing devices, the first encrypted hash value;
receiving, from each of the plurality of participant computing devices, a respective encrypted hash value signed with a private key associated with the participant computing device, each respective encrypted hash value corresponding to an entry containing a respective source of entropy;
sorting the respective encrypted hash values and the first hash value to generate a sorted list of encrypted hash values;
generating a second hash value from the sorted list of encrypted hash values;
sending, to each of the plurality of participant computing devices, the second hash value generated from the sorted list of encrypted hash values;
receiving, from each of the plurality of participant computing devices, a respective hash value generated from a respective sorted list of encrypted hash values;
comparing the second hash value generated from the sorted list of encrypted hash values to each of the respective hash values generated from the respective sorted list of encrypted hash values at least in part to determine whether each of the plurality of participant computing devices and the first participant computing device generated the same sorted list of encrypted hash values;
in response to receiving, from each of the plurality of participant computing devices, the respective hash value generated from the respective sorted list of encrypted hash values:
  receiving, from each of the plurality of participant computing devices, an entry corresponding to the respective encrypted hash value received from that participant computing device,
  verifying that correct respective encrypted hash values, each corresponding to an entry, were received,
  generating a list of entries from the received entries and the first entry,
  sorting the list of entries,
  generating a hash value from the sorted list of entries, and
  ranking the plurality of participant computing devices and the first participant computing device based on the hash value generated from the sorted list of entries.

15. The computer-readable medium of claim 14, the method further comprising:
generating a tear transaction request that includes a user identifier and a booster pack identifier and specifies a first payment for recording the tear transaction and second payment for recording an open transaction;
distributing the tear transaction for recording in the blockchain;
in response to recording the tear transaction by a first miner computing device in a first block of the blockchain, paying the first payment to the first miner computing device;
in response to recording by a second miner computing device a second block of the blockchain that is more than a specified number of blocks after the first block,
applying an open function to a booster pack associated with the booster pack identifier to transform the booster pack identifier to a transformed booster pack identifier,
generating a first open transaction that includes the user identifier, the booster pack identifier, and the transformed booster pack identifier,
causing the second miner computing device to record the first open transaction in the second block of the blockchain, and
paying the second payment to the second miner computing device.

16. The computer-readable medium of claim 14, the method further comprising:
receiving, from each of the plurality of participant computing devices, a shuffle, the shuffle corresponding to a hash chain or nonce signed using a private key associated with the participant computing device;
for each of the plurality of participant computing devices, verifying the shuffle received from the participant computing device using a public key associated with the participant computing device; and
sorting the received shuffles.

17. The computer-readable medium of claim 14, the method further comprising:
for each of the plurality of participant computing devices, calculating a penalty score for the participant computing device based on a public key associated with the participant computing device;
sorting the calculated penalty scores,
wherein choosing the participant computing device with the lowest penalty score as the first miner computing device is based at least in part on the sorted calculated penalty scores; and
receiving, from the first miner computing device, a second shuffle based at least in part on the first shuffle and a private key associated with the first miner computing device.

18. The computer-readable medium of claim 14, the method further comprising:
shuffling participant computing devices creating blocks in the blockchain at least in part by,
for each of a plurality of rounds,
  for each of the plurality of participant computing devices,
    generating a penalty score for the participant computing device, and
  selecting, from among the plurality of participant computing devices, a participant computing device with the lowest generated penalty score for creating a block in the blockchain for the round; and
  writing, to the blockchain, a block received from the selected participant computing device.

19. The computer-readable medium of claim 18, the method further comprising:
identifying a first branch and a second branch of the blockchain;
truncating the first branch and the second branch of the blockchain so that they are of equal length;
for each block of the first branch of the blockchain, calculating a penalty score for a contributor of the block of the first branch of the blockchain;
for each block of the second branch of the blockchain, calculating a penalty score for a contributor of the block of the second branch of the blockchain, and comparing the calculated penalty score for the contributor of the block of the second branch of the blockchain to a penalty score for a contributor of a corresponding block of the first branch of the blockchain;
calculating a score for each branch based on the comparisons; and
selecting a branch based on the calculated scores.

20. The computer-readable medium of claim 18, the method further comprising:
providing, to each of the plurality of participant computing devices, a maturation period;
recording a tear transaction on a selected block of the blockchain;
identifying a block in the blockchain based on the selected block and the maturation period; and
selecting a seed value based on the identified block.

21. The computer-readable medium of claim 20, the method further comprising:
recording a unique identifier in the blockchain; and
combining the selected seed value with the recorded unique identifier to derive a new seed value.

22. The computer-readable medium of claim 21, the method further comprising:
providing, to each of the plurality of participant computing devices, an awards schedule; and
determining contents of a booster pack based on the awards schedule and the derived new seed value.

23. A computing system for choosing a miner computing device of a block in a blockchain, the computing system comprising:
at least one processor;
at least one memory having instructions stored thereon executable by the at least one processor to:
encrypt a first hash value for a first participant computing device to obtain a first encrypted hash value at least in part by signing the first hash value with a private key associated with the first participant computing device, the first hash value corresponding to a first entry containing a first source of entropy;
send, to each of a plurality of participant computing devices, the first encrypted hash value;
receive, from each of the plurality of participant computing devices, a respective encrypted hash value signed with a private key associated with the participant computing device, each respective encrypted hash value corresponding to an entry containing a respective source of entropy;
sort the respective encrypted hash values and the first encrypted hash value to generate a sorted list of encrypted hash values;
generate a second hash value from the sorted list of encrypted hash values;
send, to each of the plurality of participant computing devices, the second hash value generated from the sorted list of encrypted hash values;
receive, from each of the plurality of participant computing devices, a respective hash value generated from a respective sorted list of encrypted hash values;
in response to receiving, from each of the plurality participant computing devices, the respective hash value generated from the respective sorted list of encrypted hash values:
receive, from each of the plurality of participant computing devices, an entry corresponding to the respective encrypted hash value received from that participant computing device,
verifying that correct respective encrypted hash values, each corresponding to an entry, were received,
generate a list of entries from the received entries and the first entry,
sort the list of entries, and
select, from among the plurality of participant computing devices and the first participant computing device, the miner computing device of the block in the blockchain based on the sorted list of entries.

24. The computing system of claim 23, wherein the instructions are further executable by the at least one processor to:
generate a public and private key pair for each of the plurality of participant computing devices and the first participant computing device,
select, from among the plurality of participant computing devices and the first participant computing device, the miner computing device of the block in the blockchain based on the sorted list of entries, including selecting the participant computing device with the lowest penalty score as a first miner computing device.

25. The computing system of claim 23, wherein the instructions are further executable by the at least one processor to:
select, from among the plurality of participant computing devices and the first participant computing device, the highest ranking participant computing device as a most favored miner computing device of the block in the blockchain;
for each of the plurality of participant computing devices and the first participant computing device,
calculate a distance for the participant computing device relative to the most favored miner computing device of the block in the blockchain, wherein calculating a distance for the first participant computing device relative to the most favored miner computing device comprises,
comparing a public key value associated with the first participant computing device to a public key value associated with the most favored miner computing device; and
in response to determining that the most favored miner computing device of the block in the blockchain is not available to mine the block, select a miner computing device of the block in the blockchain based on the calculated distances.

26. The computing system of claim 25, wherein the instructions are further executable by the at least one processor to:
compare the second hash value generated from the sorted list of encrypted hash values to each of the respective hash values generated from the respective sorted list of encrypted hash values at least in part to determine whether each of the plurality of participant computing devices and the first participant computing device generated the same sorted list of encrypted hash values.

27. The computing system of claim 24, wherein the instructions are further executable by the at least one processor to:
generate a tear transaction request that includes a user identifier and a booster pack identifier and specifies a first payment for recording the tear transaction and second payment for recording an open transaction;
distribute the tear transaction for recording in the blockchain;

in response to recording the tear transaction by the first miner computing device in a first block of the blockchain, pay the first payment to the first miner computing device;

in response to recording by a second miner computing device a second block of the blockchain that is more than a specified number of blocks after the first block,
- apply an open function to a booster pack associated with the booster pack identifier to transform the booster pack identifier to a transformed booster pack identifier,
- generate a first open transaction that includes the user identifier, the booster pack identifier, and the transformed booster pack identifier,
- cause the second miner computing device to record the first open transaction in the second block of the blockchain, and pay the second payment to the second miner computing device.

* * * * *

UNITED STATES PATENT AND TRADEMARK OFFICE
CERTIFICATE OF CORRECTION

PATENT NO. : 11,948,132 B2
APPLICATION NO. : 16/985711
DATED : April 2, 2024
INVENTOR(S) : Patrick Meehan It is certified that error appears in the above-identified patent and that said Letters Patent is hereby corrected as shown below:

In the Claims

In Claim 23, Column 28, Line 1:
"verifying that correct respective encrypted hash values,"
Should read:
--verify that correct respective encrypted hash values,--

Signed and Sealed this
Twenty-first Day of May, 2024

Katherine Kelly Vidal
*Director of the United States Patent and Trademark Office*